(12) United States Patent
Malhas et al.

(10) Patent No.: US 9,336,438 B2
(45) Date of Patent: May 10, 2016

(54) IRIS CAMERAS

(71) Applicants: Imad Malhas, Amman (JO); Andrew Holland, Aylesbury (GB); Alan Renforth, Malvern (GB)

(72) Inventors: Imad Malhas, Amman (JO); Andrew Holland, Aylesbury (GB); Alan Renforth, Malvern (GB)

(73) Assignee: IrisGuard Inc., Amman (JO)

( * ) Notice: Subject to any disclaimer, the term of this patent is extended or adjusted under 35 U.S.C. 154(b) by 729 days.

(21) Appl. No.: 13/646,427

(22) Filed: Oct. 5, 2012

(65) Prior Publication Data

US 2013/0088584 A1 Apr. 11, 2013

(30) Foreign Application Priority Data

Oct. 7, 2011 (GB) .................................. 1117350.7

(51) Int. Cl.
*G06K 9/00* (2006.01)
(52) U.S. Cl.
CPC .................................. *G06K 9/00604* (2013.01)
(58) Field of Classification Search
CPC ................................................. G06K 9/00604
USPC .......................................................... 348/78
See application file for complete search history.

(56) References Cited

U.S. PATENT DOCUMENTS

| 2002/0131622 | A1 | 9/2002 | Lee et al. | |
| 2005/0084137 | A1* | 4/2005 | Kim | G06K 9/00597 382/115 |
| 2007/0171297 | A1* | 7/2007 | Namgoong | G06K 9/00604 348/362 |
| 2009/0016574 | A1* | 1/2009 | Tsukahara | A61B 5/117 382/117 |
| 2010/0290668 | A1* | 11/2010 | Friedman | G06K 9/00604 382/103 |

FOREIGN PATENT DOCUMENTS

WO WO 2009/029757 3/2009

OTHER PUBLICATIONS

United Kingdom Intellectual Property Office, Search Report, Patent Application No. GB 1117350.7, Nov. 9, 2011, three pages.

\* cited by examiner

*Primary Examiner* — Mohammed Rahaman
(74) *Attorney, Agent, or Firm* — Fenwick & West LLP

(57) ABSTRACT

An iris camera for capturing an image of an iris of a user is described. The iris camera comprises: a lens; an image sensor for capturing an image produced by the lens; a processor for analyzing the degree of focus of successive images produced by the sensor and for controlling a lens position adjustment motor to move the lens to a position where a subsequent captured image potentially has an increased degree of focus; and a proximity sensor for providing an initial measurement of the distance between the lens and the user. The processor is arranged to user the initial distance measurement obtained by the proximity sensor as a starting point for capturing images of the iris to effect a fine-focus adjustment.

23 Claims, 7 Drawing Sheets

IrisGuard Pixel to Iris Calculator

| Distance from lens to eye mm | Resolution at that distance pix/mm | No. pixels across ave. iris (ave. iris = 12 mm across) |
|---|---|---|
| 60 | 110.57 | 1326.79 |
| 110 | 60.31 | 723.70 |
| 160 | 41.46 | 497.54 |
| 210 | 31.59 | 379.08 |
| 220 | 30.15 | 361.85 |
| 230 | 28.93 | 347.19 |
| 240 | 27.64 | 331.70 |
| 250 | 26.54 | 318.43 |
| 260 | 25.52 | 306.18 |
| 270 | 24.57 | 294.84 |
| 280 | 23.69 | 284.31 |
| 290 | 22.88 | 274.51 |
| 300 | 22.11 | 265.36 |
| 310 | 21.33 | 256.00 |
| 320 | 20.73 | 248.77 |
| 330 | 20.10 | 241.23 |
| 340 | 19.51 | 234.14 |
| 350 | 18.95 | 227.45 |
| 360 | 18.43 | 221.13 |
| 370 | 17.93 | 215.15 |
| 380 | 17.46 | 209.49 |
| 390 | 17.01 | 204.12 |
| 400 | 16.58 | 199.02 |
| 410 | 16.18 | 194.16 |
| 480 | 14.42 | 173.06 |
| 510 | 13.01 | 156.09 |

Approx. 100mm capture box

Within ISO range of 200-300 pixels across iris

Within range of embodiment of 220-280 pixels across iris

Fig. 5

IRIS CAMERAS

CROSS REFERENCE TO RELATED APPLICATIONS

This application claims the right of priority under 35 U.S.C. §119 to GB application serial no. 1117350.7, filed Oct. 7, 2011, which is incorporated by reference in its entirety.

FIELD

This invention relates to systems, apparatus and methods for capturing iris images. The approach provides convenience of use and enables iris capture for a wide range of users.

BACKGROUND

The human iris is a muscle for controlling pupil dilation and consequently how much light enters the eye for image formation on the retina. This muscle has such rich variations in pigmentation patterns across the global population that no two people ever have the same patterns. Even twins and eyes of the same individual are greatly different and this provides an opportunity for powerful identity checking technology. It is a result of the vast number of degrees of freedom inherent in iris patterns compared with the size of the global population, or even compared with the number of humans that have ever or will ever exist, that iris recognition offers such a powerful opportunity for identity verification. Iris recognition technology is much better at differentiating between individuals than traditional methods such as presenting original photo documentation, signing, using chip and PIN and fingerprint matching.

Systems based on iris recognition are applicable in a range of applications including commercial and official contexts where identity checks are important for commercial, legal, security or other reasons. For example, certain airports currently employ the use of iris cameras for verifying the identity of individuals crossing national boarders.

Iris cameras for use in iris recognition technology must obtain images that can be checked against reference images forming part of a user profile for that individual. The iris camera is therefore one element of the whole iris recognition system, where other elements include a database storing reference images, or at least data derived from such images, as part of a remote user profile for registered users of iris recognition. If the user profile contains reference data derived from an initial reference image, the reference data acts like a barcode uniquely identifying that user. This saves on memory required to store the material against which future identity checks are made.

In order to register for iris recognition a user must therefore have reference images of their irises taken for their user profile. An iris camera is clearly required for this registration process, as well as for subsequent instances when the technology is being used by the user to access various rights or authorise a transaction. However, the camera used in the registration step is not necessarily the same camera as the one used in subsequent instances because of course a user may register, for example, at a bank and subsequently require ATM services elsewhere gaining access by iris recognition.

In order to be practically useful, iris cameras must be able to perform well with a high volume of users. This means firstly that the system must be straightforward and convenient to use for each individual using the camera. One of the most important practical considerations in terms of convenience of use is to make it easy for the user to position their head correctly for the camera to acquire images of both irises. Different users will naturally adopt varying positions in the forwards-backwards dimension and the camera system must be able to cope with this, rapidly acquire both irises and be ready to repeat the process for the next user. The depth of the volume in which each of a user's eyes can be positioned for successful iris capture —i.e. the depth of the capture box— should therefore be reasonably generous.

The requirement that the camera must cope with a high volume of users means, secondly, that no classes of iris types or positions should present problems to the camera system. One aspect of this issue is related to iris positions based on the distance between a user's pupils. Certain racial heritages are associated with particularly wide or particularly narrow inter-pupillary distances compared with the majority in the global population. The iris camera's field of view should be adequate to accommodate the full range of inter-pupillary distances with which it might be presented.

In order to provide a deep capture box and a wide field of view, some known methods use iris cameras with high curvature lenses associated with a high depth of field. The high depth of field provides a deep capture box and the high curvature lens surface captures incident light at wide angles. However, in order to mitigate defocusing effects near the edges of the lens which are most pronounced in high curvature lenses, diaphragms are placed in front of the lens the reduce the aperture and effectively refocus the resultant image. This reduces the overall amount of light that can pass through the lens and form an image on the other side. Consequently, image resolution is poor and typically the optical resolution of the image falls short of the equivalent resolution—in pixels per unit area—of the camera's image sensor. In this way, the optics of many known iris cameras degrade the quality of the image which could be obtained by the image sensor.

Other known methods use a lower curvature lens so that defocusing effects at the lens periphery are less and a diaphragm with a larger aperture can be used to let more light in. This improves image resolution. However, the shallow lens curvature tends to restrict field of view, which in turn restricts the width of the capture box, making it inconvenient for users and reducing the range of inter-pupillary distances that can be accommodated. Furthermore, the shallow curvature lens is associated with a small depth of field (shallow focus) which does not extend across the full range of the capture box. In order to produce in-focus images of irises in the capture box, the lens itself must therefore be moved to suit the position of the user's eyes. Automatic fine-focus systems are typically employed having motors controlled by various electronic feedback loops, which move the lens so that the in-focus region corresponds to the position of the irises.

The feedback loops form part of an iterative autofocus system in which successive captured images are digitally analysed to assess their level of focus. Image analysis software provides a measure of focus for successive images, successive measurements of improving or worsening focus are used to make decisions as to where the lens should be moved next. The images gradually approach focus and once an acceptable level of focus has been achieved iris images can be captured.

However, this process is time consuming If the lens starts far away from the in-focus position, the iterative procedure of fine-focus will contribute significantly to the total time from start to finish for a user to position him or herself at the device and for dual iris acquisition to be completed. This time-consuming feature is clearly disadvantageous where the camera is to be used in a high throughput application, for example scanning people's irises as a security measure at an airport, for example.

The present invention seeks to address some or all of the above issues.

SUMMARY

In a first aspect, the present invention provides an iris camera for capturing an image of an iris of a user, the iris camera comprising: a lens; an image sensor for capturing an image produced by the lens; a processor for analysing the degree of focus of successive images produced by the sensor and for controlling a lens position adjustment motor to move the lens to a position where a subsequent captured image potentially has an increased degree of focus; and a proximity sensor for providing an initial measurement of the distance between the lens and the user; wherein the processor is arranged to user the initial distance measurement obtained by the proximity sensor as a starting point for capturing images of the iris to effect a fine-focus adjustment.

The key advantage of this arrangement is that the focussing of each image to be captured by the camera is faster as the proximity sensor provides a very good estimate of where the iris is located and this can be used as the starting point of the fine-focus adjustment of the lens.

The proximity sensor may be adapted to output an electromagnetic pulse, preferably towards a user's forehead, and measure the distance to the object by measuring how long it takes for the pulse to be reflected back. This is a very simple, fast and non-intrusive way of determining the proximity of the user's forehead (and hence the likely position slightly further away of the user's iris).

The iris camera is preferably adapted to capture at least one iris image for translation into an identity check template for a biometric matching engine in under five seconds.

The capture box of the iris camera is preferably 100 mm deep, and advantageously accommodates user inter-pupillary distances of between 49 mm and 79 mm. The camera field of view is preferably about 11°.

Advantageously, the lens of the iris camera has a resolution of 22 lines per mm for 98% of the lens surface, an anti-reflective coating—preferably in the wavelength range 700 mm to 900 mm, and three glass elements (i.e. the lens is preferably a triplet lens). Preferably, the iris camera is optically matched to at least a 1.3 Mpixel image sensor, and adapted to capture an image between 200 and 300 pixels across the iris (according to the ISO standards).

According to a second aspect of the present invention, there is provided a method of capturing an image of an iris of a user using an iris camera, the method comprising: capturing an image produced by a lens of the iris camera; analysing the focus level of successive captured images; controlling a lens position adjustment motor to move the lens to a position where a subsequent captured image potentially has an increased focus level; obtaining an initial proximity measurement of the distance between the lens and the user; and using the initial proximity measurement as a starting point for capturing images of the iris and moving the lens to effect a fine-focus adjustment.

BRIEF DESCRIPTION OF THE DRAWINGS

Specific embodiments of the invention will now be described, by way of example, with reference to the accompanying drawings, of which:

FIG. 5 is a table showing quantitative aspects of the optics of the iris camera of FIG. 1;

DETAILED DESCRIPTION

Figure 1:
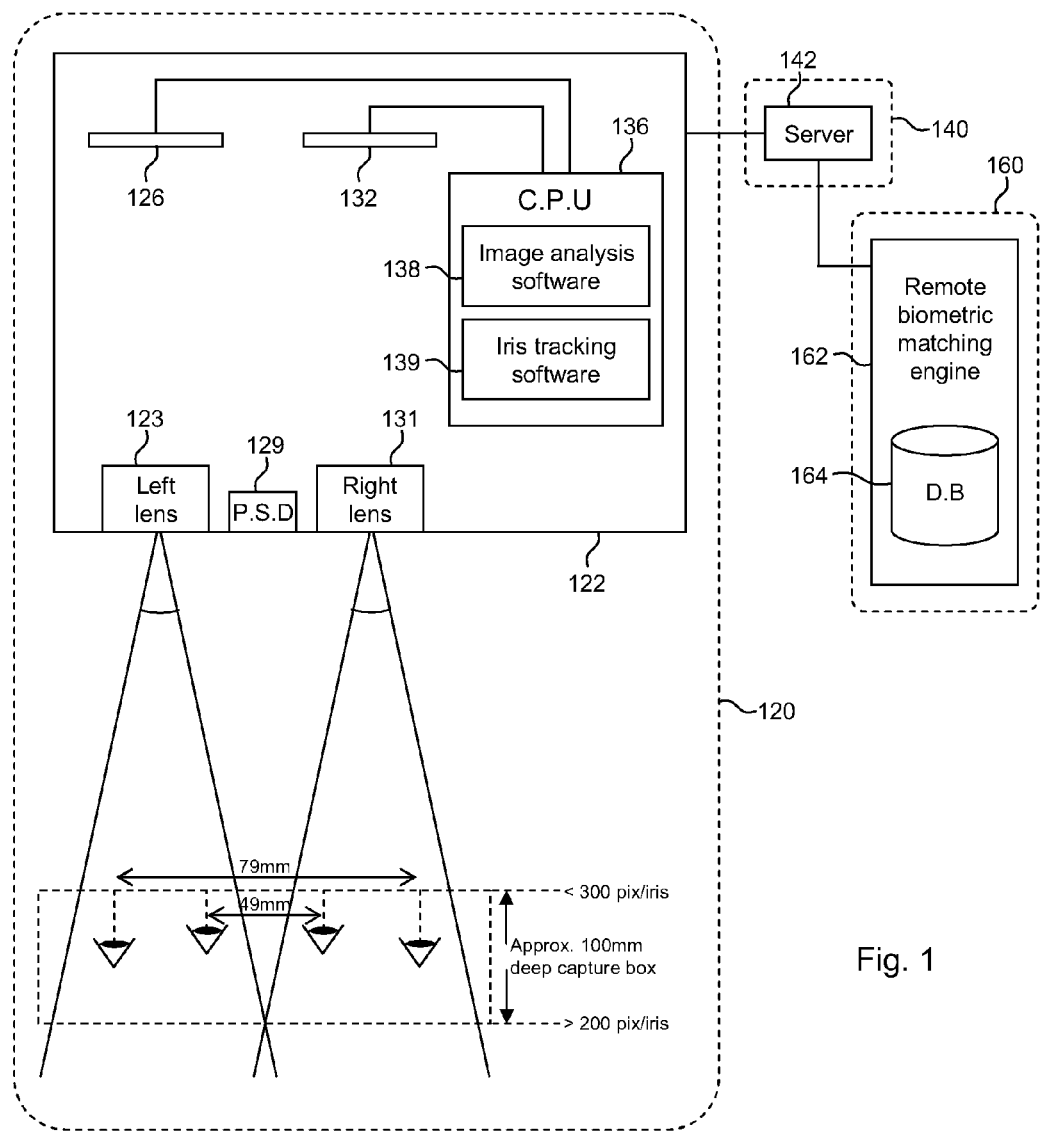
FIG. 1 is a schematic block diagram showing an iris camera according to an embodiment of the invention, the iris camera being in communication with a remote biometric matching engine via a server.

The elements of an iris camera 122 embodying the present invention are shown in FIG. 1, together with a server 142 with which, in use, the camera 122 communicates, and a remote biometric matching engine 162 in communication with the server 142. The iris camera 122 supplies quality assured iris images to the server 142 for use in biometric identification checks that are run by checking against reference data stored in the matching engine 162.

Figure 2:
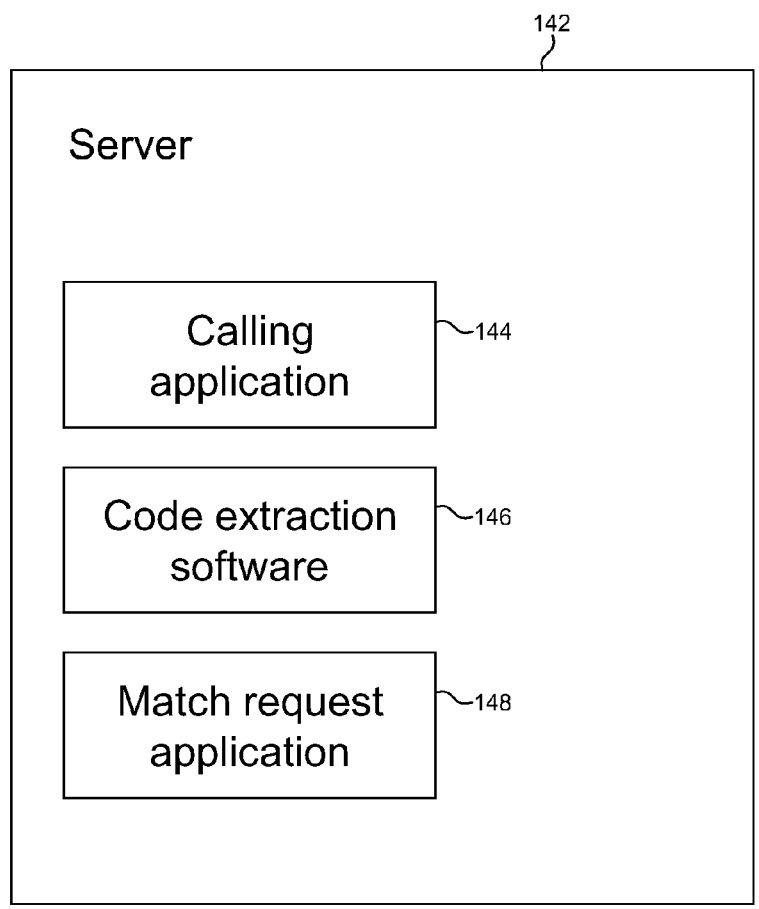
FIG. 2 is a schematic block diagram showing the server of FIG. 1 in greater detail.

Referring now to FIG. 2, the server 142 is shown in greater detail. The server 142 may be a client personal computer (PC), a client computer network or other computing infrastructure of or for the client. Communication with the server 142 may be indirect via a host of the iris camera and/or the client, including through a host switch which enables communication between a camera domain 120 and a client domain 140. The client domain 140 may communicate with a network of iris cameras through such a switch. A calling application 144 for requesting sets of iris images may be provided in the client software. Applications 146 for extracting unique codes from incoming images may also be provided here, so that data files smaller than whole images may be sent to the matching engine 162 for faster matching. In this regard a match request application 148 is provided in the server for constructing a matching request and communicating with the matching engine 162.

The client is any organisation requiring that the identity of individuals be verified before certain permissions or access can be granted or certain transactions can be carried out. Examples include banks, point of sale (POS) terminals, auto-telling machine (ATM) terminals, high security departments or facilities and national border controls. A range of clients may be served by a single matching domain 160.

Figure 3:
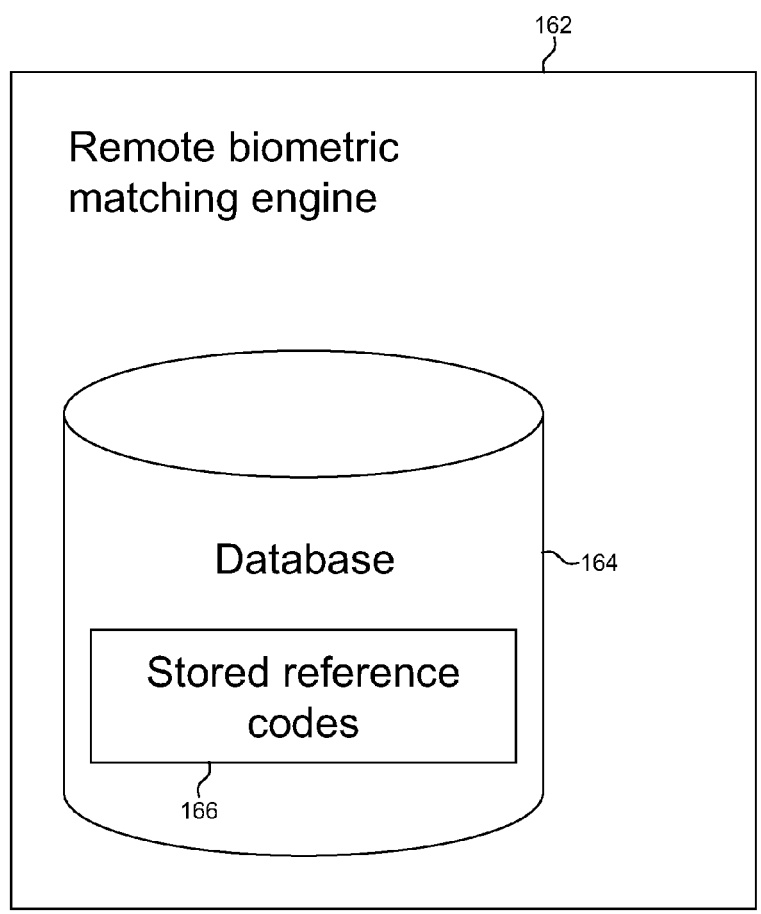
FIG. 3 is a schematic block diagram showing the remote biometric matching engine of FIG. 1 in greater detail.

Referring now to FIG. 3, the biometric matching engine 162 comprises computing infrastructure housing a database 164 containing data files 166 relating to users for the purpose of verifying their identity in biometric security checks. The matching domain 160 may be remote from both the camera and client domains 120, 140 and may communicate with the client domain 140 either directly or via one or more hosts, including via a switch so that it may communicate with a network of clients.

Some aspects of the present embodiment relate to the elements inside the camera domain 120. More specifically, as shown in FIG. 1, the camera 122 comprises left and right lens systems 123, 131, one for each iris, and a central processing unit (CPU) 136 which may, for example, be an embedded chip or a PC. In the embodiment shown, each lens system 123, 131 comprises a triplet lens (described further below) with associated automatic fine-focus capability and an image sensor 126, 132. The image sensors 126, 132 digitise images formed by the camera optics and provide them to the CPU 136 for processing, for which various applications 138, 139 are used to analyse the images and send feedback instructions for making adjustments. An image analysis application 138 for making adjustments as part of an automatic fine-focus system is provided, as is an iris tracking application 139 for performing iris-tracking in which adjustments are made to keep the pupil in-focus and centred as the user invariably moves their head during the image capture process.

In another embodiment of the present invention, there is a single image sensor in the image plane that spans both the left and right images, and the images are only separated out at a later stage using image analysis software.

In the embodiment of FIG. 1, the image sensors have a resolution of 1.3 M pixels, and the optics of the iris camera are matched to the resolution of the image sensors.

Figure 4:
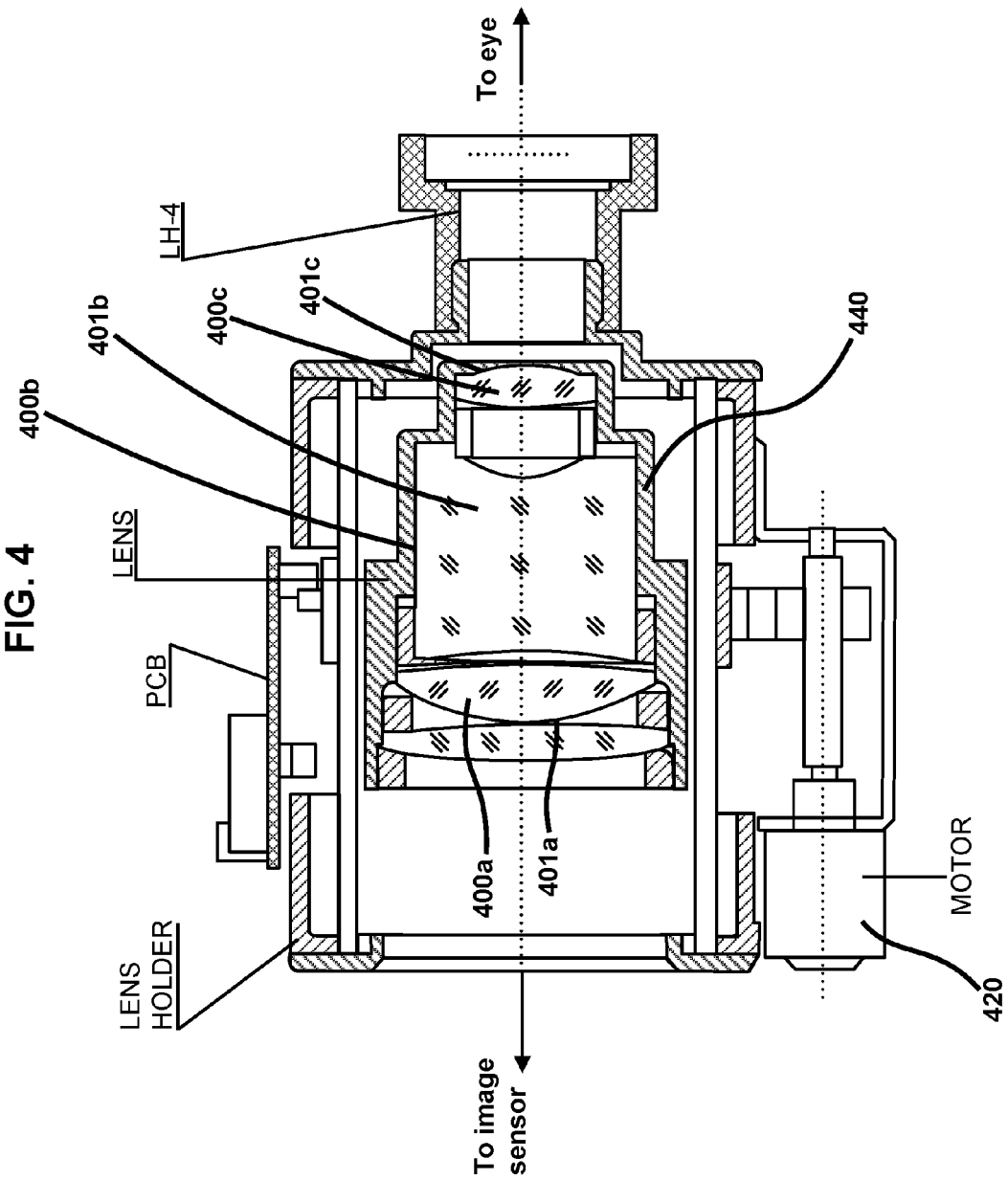
FIG. 4 is a schematic sectional view of the lens system of the iris camera of FIG. 1.

The lens system 123, 131 is shown in more detail in FIG. 4. Each of the right and left lenses 123, 131 is a triplet lens having three glass elements 400a, 400b and 400c, each glass element being manufactured from high grade glass, and having an anti-reflective coating 401a, 401b, 401c in the optimum wavelength range for iris recognition (around 700 nm to 900 nm). The lens has an optical resolution of 22 lines per mm over 98% of its surface. This high illumination gives rise to an image of high optical resolution which means that the image incident on the image sensor is information rich. There is sufficient information in the image to make proper use of all the pixels of the image sensor, and in this way the optics of the camera are matched to the full resolution capability of the image sensor. This means that each pixel of the image sensor conveys information about the image which is useful in the matching process.

Production of a high-resolution image increases the reliability in general of the iris camera for verifying identity. This embodiment is also adapted for high applicability across the range of iris colourings in the population. Different colourings require different frequencies of illumination for the pigmentation features of the iris to be detected. For example, darker eyes absorb more higher frequencies than blue eyes, and if only these frequencies are used the dark iris cannot be localised. To illuminate the iris for correct feature extraction, illumination angular spread and power are required to be matched to both the optical path (lens) and the dynamic sensitivity of the image sensor. All these criteria need to be correct so that the irises from humans with different ethnic background are not precluded from using their iris biometric trait to identify themselves. The differences in the pigmentation and melanin of the iris structure from a light to a dark-coloured iris require different wavelengths of NIR (Near InfraRed) illumination to allow correct feature extraction.

The glass elements 400a, 400b, 400c are supported by a lens mount assembly 440 and a spacer 460. A motor 420 controls the position of the glass elements as part of the camera's automatic fine-focus system.

In the embodiment of FIG. 1, the capture boxes of the left and right lens systems each have a field of depth of 100 mm. This provides a generous region in which a user can be positioned so that images of his or her irises can be captured. As a result, there is no problem if different users adopt different positions within the generous capture box, and slight changes in a person's position during the process will not matter. Images acquired from anywhere in the capture box of this embodiment satisfy the ISO standard requirement that an iris image must be between 200 and 300 pixels across (see FIG. 5).

The capture boxes are also sufficiently wide to cope with the full range of interpupillary distances in the global population. The minimum and maximum interpupillary distances, 49 mm and 79 mm respectively, are indicated in FIG. 1. As shown, the irises of an individual at a nominal distance of 300 mm from the lens aperture fit inside the capture boxes, whether they have the minimum, the maximum or an intermediate interpupillary distance (IPD). This is made possible by the field of view of 11.06° of each of the lens systems of the embodiment.

The proximity sensor device 129 shown in FIG. 1 is used at the beginning of the process of iris capture to measure the distance to a user's forehead. This provides an approximate measure of the distance from the lenses to the irises and is used to put the camera in approximate focus. This gives the fine-focus system a head start so that fewer iterations of the fine-focus protocol (method)—and consequently less time—are required before complete focus is achieved.

Figure 6:
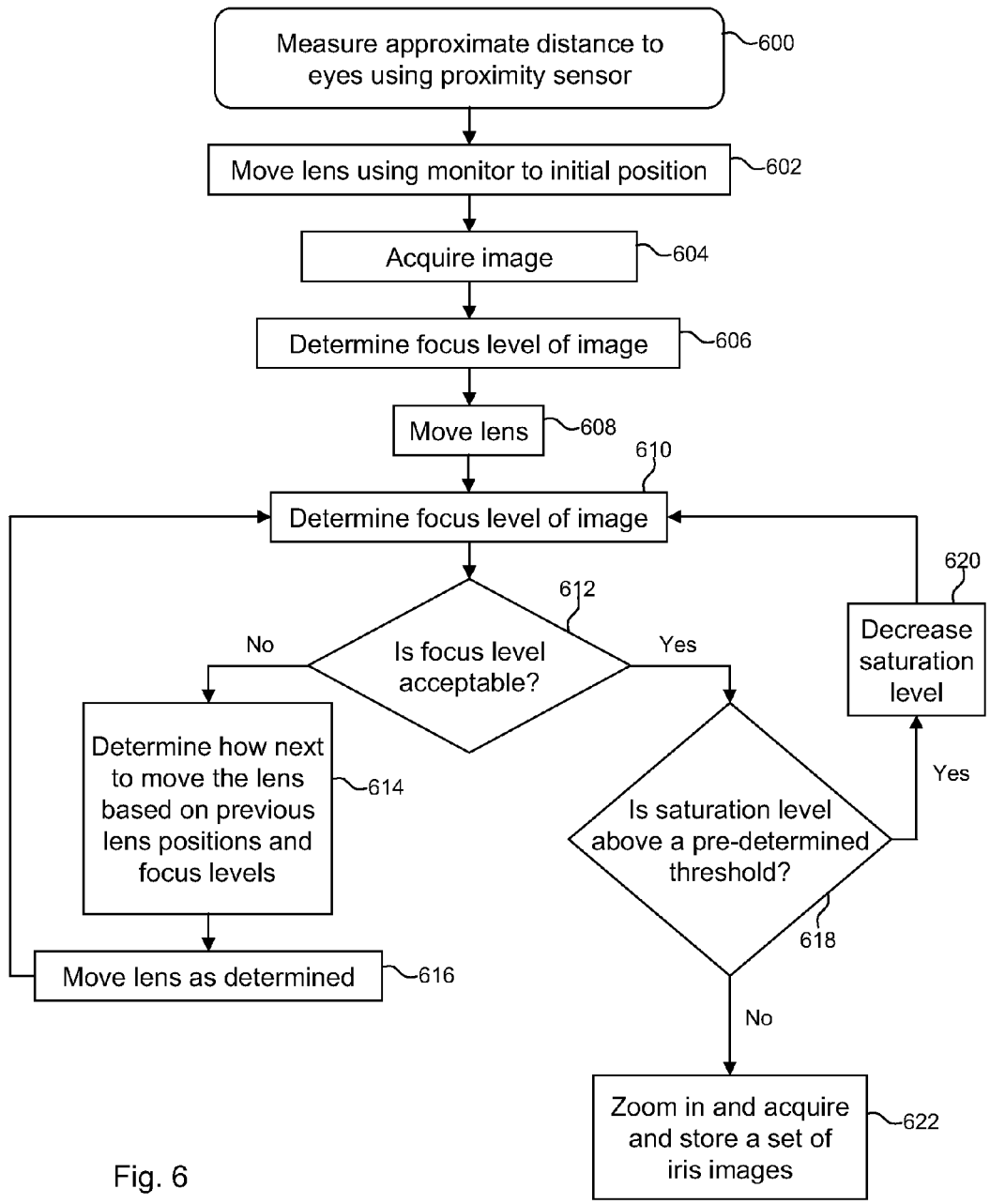
FIG. 6 is flowchart showing a focussing procedure of the iris camera of FIG. 1.

Following this approach, a method for rapidly focussing an iris camera will now be described with reference to FIG. 6.

An approximation of the distance to the irises is measured at Step 600 using the proximity sensor which outputs an electromagnetic pulse and measures how long it takes for the pulse to be reflected back from the user's forehead. The proximity sensor comprises a pulse generator for generating the output pulse and a sensor which detects the return signal. The distance measured is only an approximation of the distance from the lenses to the irises because the iris and forehead are not at exactly the same distance, and variations in user cranial size, as well as scarves and other headgear being worn make this measurement a less accurate approximation.

Based on this initial distance measurement, the lens is moved at Step 602 to a position which provides a first approximation to focus. This rough focus is then tested by acquiring at Step 604 an image and determining at Step 606 the level of focus of the image. To further improve focus, the first approximation to focus and the improved focus are compared together with their associated lens positions and lens is accordingly moved at Step 608 to a third position. The new focus level is determined (step 610) and, if it is still out of focus, the camera cycles through further iterations, moving the lens based on focus information learnt from previous cycles and re-measuring focus at Steps 614, 616, 610). Each time the CPU 136 controlling the process using tries to determine the degree of blur in the image (sharpness of the image and inversely proportional to focus) and looking at the history of previous positions and levels of blur determine where to move the lens to best minimise blur (and hence get the image into focus).

Once focus has been achieved, a further check is performed before a final set of images is captured and output. The focussed image is analysed at Step 618 for saturation level and if it is above a pre-determined threshold, saturation is decreased at Step 620 before re-checking focus at Steps 610, 612. This ensures that the in-focus state of the image is not merely a result of high saturation of the image, which can sometimes lead to a false positive for focus. If the image is found to be in focus and at the same time saturation is not too high (below the pre-set threshold level), the camera zooms in to the iris and acquires and stores at Step 622 a set of images to be output to the server.

Figure 7:
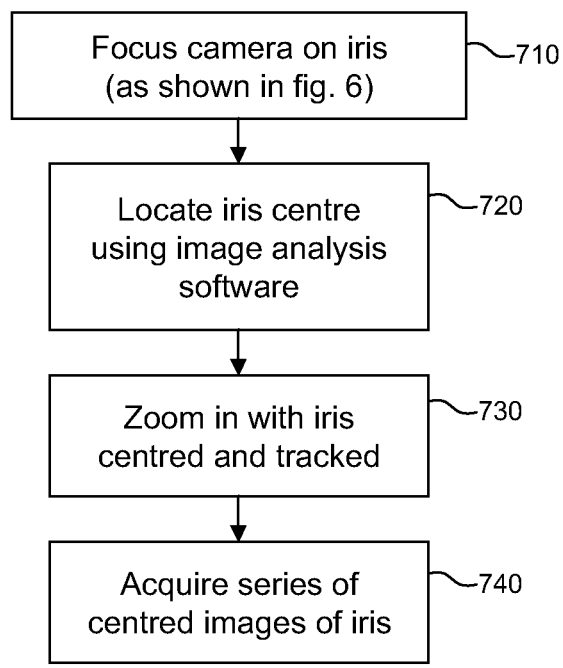
FIG. 7 is a flowchart showing an image acquisition procedure of the iris camera of FIG. 1.

Referring to FIG. 7, before zooming, the image analysis software differentiates the intensity profile of the image in order to locate the edges of the iris and pupil. The pupil centre can then be located at Step 720 and the camera optically zooms in at Step 730 on the iris with the iris centred and tracked. To complete the session, and with the pupil centre still tracked, a video graphics array (VGA) resolution image is streamed to acquire at Step 740 a series of focussed, centred images. The process occurs for both eyes simultaneously and the total time required is between 1 and 5 seconds to acquire a set of quality checked images for coding into iris templates for presentation to a biometric matching engine to be stored as reference identification data for that particular user. Subsequent identity checks against this stored reference data, from iris capture to delivery of a result, take around 1 second.

Having specifically described embodiments of the present in detail, it is to be appreciated that the above described embodiments are exemplary only and that modifications will occur to those skilled in the art without departure from the spirit and scope of the present invention. For example, even though a specific pulsed proximity sensor has been described any form of proximity sensor which give and accurate reading relatively quickly could be used.

What is claimed is:

1. An iris camera for capturing one or more images of irises of a user, the iris camera comprising:
    a lens;
    two image sensors for capturing one or more images produced by the lens, the two image sensors being spaced-apart, each one of the two spaced-apart image sensors being adapted and positioned to capture an image of a different iris of the user;
    a processor for analyzing the degree of focus of successive images captured by the sensors and for controlling a lens position adjustment motor to move the lens to a position where a subsequent captured image potentially has an increased degree of focus; and
    a proximity sensor for providing an initial measurement of the distance between the lens and the user, the proximity sensor being positioned between the two spaced-apart image sensors;
    wherein the processor is arranged to use the initial distance measurement obtained by the proximity sensor as a starting point for capturing images of the iris to effect a fine-focus adjustment.

2. The iris camera according to claim 1, wherein the proximity sensor is adapted to output an electromagnetic pulse and measure the distance to the user by measuring how long it takes for the pulse to be reflected back from the user.

3. The iris camera according to claim 1, wherein the proximity sensor is adapted to output the pulse towards a user's forehead.

4. The iris camera according to claim 1, further comprising a lens position adjustment motor which is responsive to the processor for adjusting the position of the lens.

5. The iris camera according to claim 1, wherein the iris camera is adapted to capture at least one iris image and to translate the same into an identity check template for transmission to a biometric matching engine, wherein the process of image capture and translation into the template is carried out by the iris camera in under five seconds.

6. The iris camera according to claim 1, wherein the lens has associated with it an image capture box bounding a region in which the one or more images of the irises can be captured, and the capture box has a depth of at least 100 mm.

7. The iris camera according to claim 6, wherein the iris camera is arranged to position its capture box to accommodate maximum user inter-pupillary distances of 79 mm.

8. The iris camera according to claim 6, wherein the iris camera is arranged to position its capture box to accommodate minimum user inter-pupillary distances of 49 mm.

9. The iris camera according to claim 6, wherein the lens has a field of view of about at least 11°.

10. The iris camera according to claim 1, wherein the lens has a resolution of 22 lines per mm for 98% of the lens surface.

11. The iris camera according to claim 1, wherein the lens comprises an anti-reflective coating.

12. The iris camera according to claim 11, wherein the anti-reflective coating has a high frequency pass filter characteristic enabling electromagnetic radiation in the wavelength range 700 nm to 900 nm to pass.

13. The iris camera according to claim 1, wherein the lens is a triplet lens comprising three glass elements.

14. The iris camera according to claim 1, wherein at least one of the sensors has a resolution of at least 1.3 Megapixels.

15. The iris camera according to claim 1, wherein the iris camera is adapted to capture iris images that are between 200 and 300 pixels across in resolution.

16. The iris camera according to claim 1, wherein the processor is arranged to analyze the saturation level of the captured one or more images and to adjust the saturation level of the one or more captured images if they are above a predetermined threshold.

17. The iris camera according to claim 16, wherein the processor is arranged to reanalyze the degree of focus of the one or more images once its saturation level has been adjusted and to use the new degree of focus measurement in controlling a lens position adjustment motor.

18. The iris camera according to claim 1, wherein the processor is arranged to zoom into a portion of the one or more captured images that represents the iris and to center the analyzed image on this portion.

19. The iris camera according to claim 18, wherein the processor is arranged to track the movement of the irises by centering the one or more images of the irises captured subsequently.

20. A method of capturing one or more images of the irises of a user using an iris camera, the method comprising:
    capturing, by two image sensors, one or more images produced by a lens of the iris camera, the image sensors being spaced-apart and each sensor being adapted and positioned to capture an image of a different iris of the user;
    analyzing the focus level of successive captured images;
    controlling a lens position adjustment motor to move the lens to a position where a subsequent captured image potentially has an increased focus level;
    obtaining, by a proximity sensor, an initial proximity measurement of the distance between the lens and the user, the proximity sensor positioned between the two spaced-apart image sensors; and
    using the initial proximity measurement as a starting point for capturing images of the irises and moving the lens to effect a fine-focus adjustment.

21. The method according to claim 20, wherein the analyzing step comprises:
    assessing the level of focus of a first image associated with a first lens position;
    assessing the level of focus of a second image associated with a second lens position; and
    determining a direction in which the lens should be moved in order to capture a third image having an increased level of focus as part of an iterative auto-focusing protocol.

22. The method according to claim 20, wherein the capturing, analyzing and controlling steps are repeated until a predetermined level of focus has been determined from a captured image.

23. A non-transitory computer readable storage medium having instructions stored thereon, the instructions executable by a processor and comprising:
- capturing, by two image sensors, an image produced by a lens of an iris camera, the image sensors being spaced-apart and each sensor being adapted and positioned to capture an image of a different iris of a user;
- analyzing the focus level of successive captured images;
- controlling a lens position adjustment motor to move the lens to a position where a subsequent captured image potentially has an increased focus level;
- obtaining, by a proximity sensor, an initial proximity measurement of the distance between the lens and the user, the proximity sensor positioned between the two spaced-apart image sensors; and
- using the initial proximity measurement as a starting point for capturing images of the iris and moving the lens to effect a fine-focus adjustment.

* * * * *